Dec. 13, 1960   H. MALKOFF ET AL   2,963,882
RADIAL AIR FLOW REFRIGERATION EVAPORATOR WITH
MEANS FOR HEATING THE DRIP PAN
Filed June 4, 1958   2 Sheets-Sheet 1
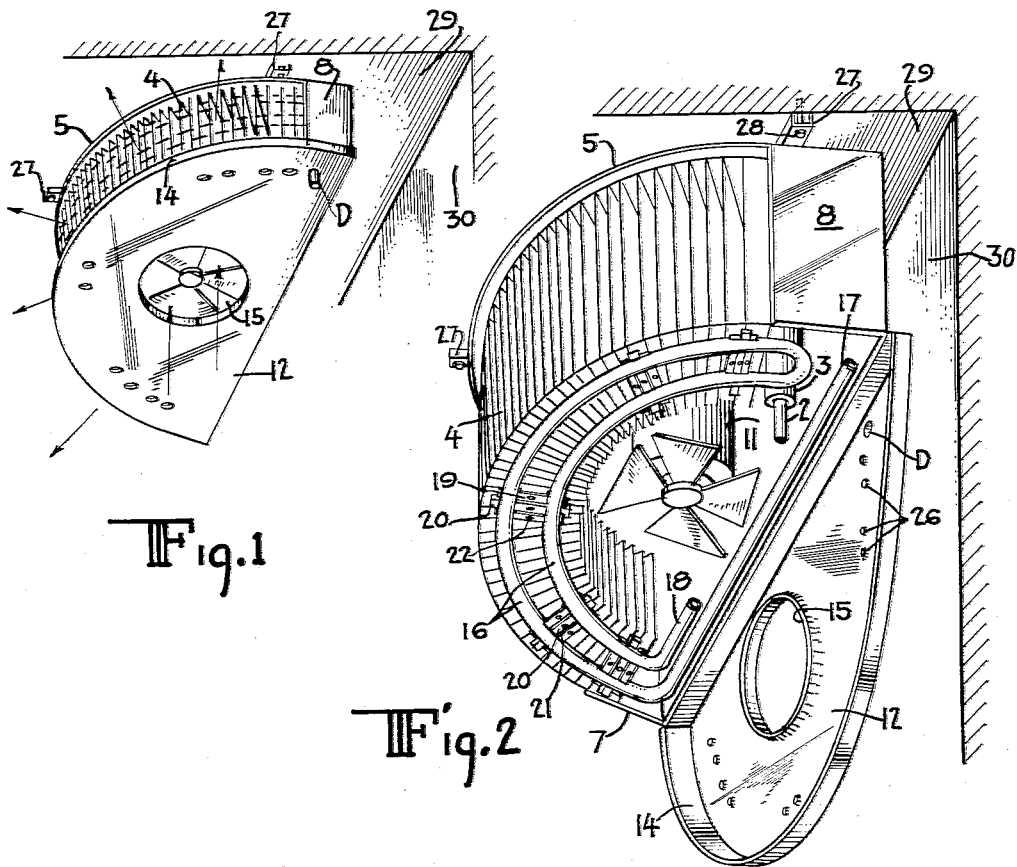
Fig.1
Fig.2
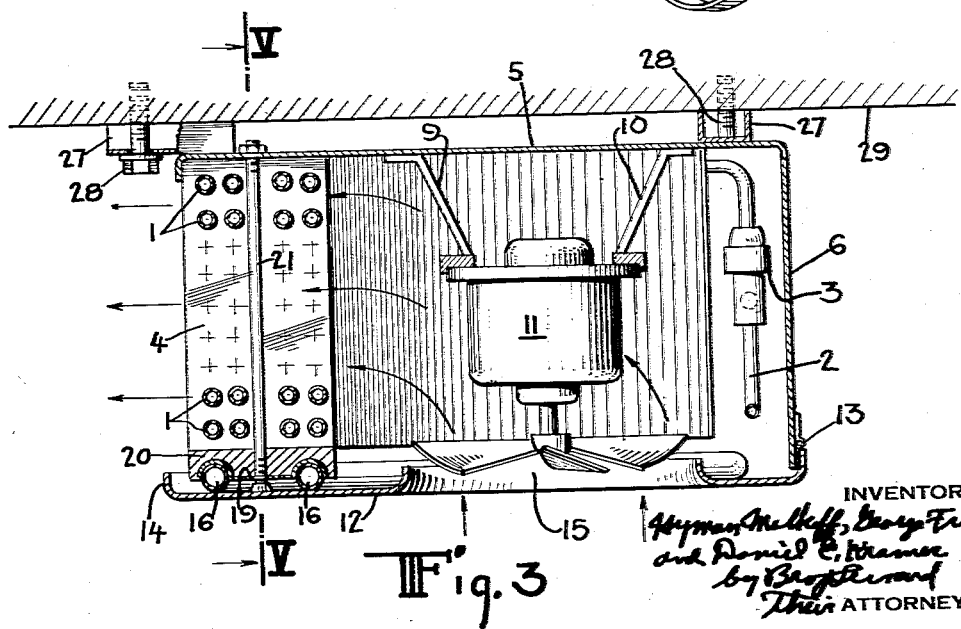
Fig.3
INVENTORS
*Hyman Malkoff, George Frie and Daniel C. Kramer*
by *Brotherward*
*Their* ATTORNEYS Dec. 13, 1960     H. MALKOFF ET AL     2,963,882
RADIAL AIR FLOW REFRIGERATION EVAPORATOR WITH
MEANS FOR HEATING THE DRIP PAN
Filed June 4, 1958     2 Sheets-Sheet 2
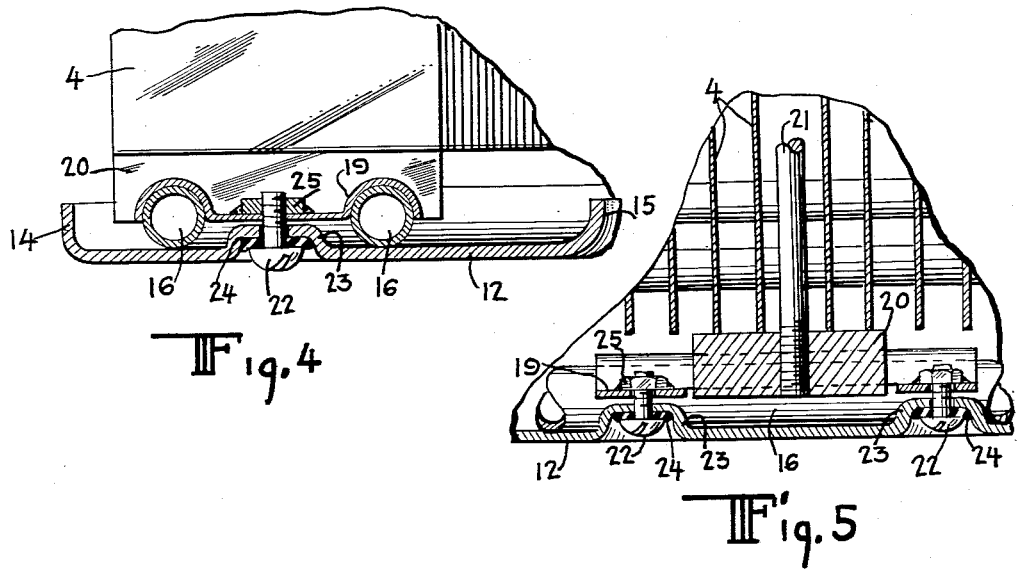
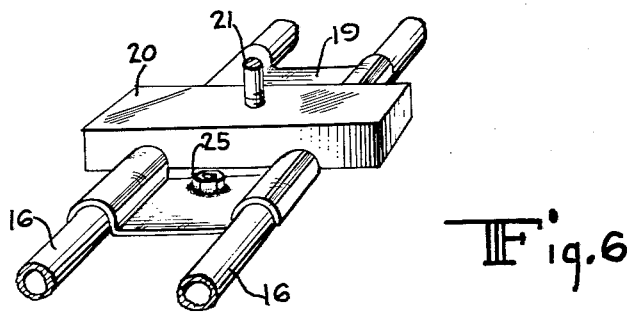
INVENTORS
ATTORNEYS United States Patent Office 2,963,882
Patented Dec. 13, 1960

2,963,882

RADIAL AIR FLOW REFRIGERATION EVAPORATOR WITH MEANS FOR HEATING THE DRIP PAN

Hyman Malkoff, Levittown, Pa., and George Frie and Daniel E. Kramer, Trenton, N.J., assignors to Kramer Trenton Company, Trenton, N.J., a corporation of New Jersey Filed June 4, 1958, Ser. No. 739,759

4 Claims. (Cl. 62—276)

This invention relates to a radial air flow refrigeration evaporator with means for heating the drip pan, and is calculated to provide a unit of this type which is adapted for incorporation in low temperature refrigeration systems, e.g. those in which the cold room or space is intended to have a temperature of, say, from zero to minus twenty degrees, Fahrenheit, and the evaporator is, at selected intervals, defrosted by hot gas flowing from the compressor discharge.

A characteristic object of the invention is to incorporate in the evaporator unit means for supplying heat to the drip pan into which the melted frost falls from the coils and fins of the evaporator during defrosting cycles, to prevent re-freezing of the said drip water in the pan before it passes off into the sewer or other disposal point.

Another object is to make such provision without hampering the practice of occasional opening of the drip pan for installing and servicing elements embraced within the unit such, for instance, as thermostatic expansion valve or fan motor.

Another object is to make the said provision without complicating the structure to an appreciable extent or enlarging the same.

A further object is to provide certain improvements in the construction and arrangement whereby the above named, and other objects inherent in the invention, may be efficiently attained.

A practical embodiment of the invention is represented in the accompanying drawings, in which, Fig. 1 represents in perspective the complete unit, with drip pan closed, secured in operative position to the ceiling of a cold room;

Fig. 2 represents, on a larger scale, a similar view with the drip pan open;

Fig. 3 represents, on the same scale as Fig. 2, a vertical central section, with the drip pan closed, certain parts being shown in full lines;

Fig. 4 represents, on a still larger scale, a detail sectional view, partly in elevation, exhibiting devices for fastening the drip pan and its heating means in operative position;

Fig. 5 represents a detail vertical section, on the same scale as Fig. 4, taken in the plane of the line V—V of Fig. 3, looking in the direction of the arrows; and Fig. 6 represents a perspective detail view of the said fastening means.

In brief summary, the invention comprehends a semi-circular evaporating unit of the radial air flow type such, for instance, in general, as is disclosed in U.S. Patent No. 2,486,145, dated October 25, 1949, although the fan of the present evaporator rotates in a horizontal, rather than vertical, plane. The drip pan for catching the melt during defrosting cycles is hinged at the bottom of the straight back of the unit casing to provide for interior installation, inspection and servicing when desired. A heating tube for affecting the pan is securely fixed to the bottom of the evaporator coil in such position as to be contacted by the pan when the latter is closed, and devices are included for pressing the pan against its heating tube; which latter, like the evaporator coil, is adapted to receive flow of hot gas from compressor discharge during defrosting cycles of the refrigerating system.

In the past it has been customary to employ evaporating coils of this general type in systems designed for moderate temperatures in the cold room or space, e.g. from thirty-two to fifty degrees, Fahrenheit. Even under such conditions the evaporator coil requires occasional defrosting because, in order to establish a temperature of, for example, thirty-six degrees, Fahrenheit, in the room or space, the temperature of the refrigerant circulating through the coil must be below freezing, say, about twenty degrees, Fahrenheit. In these systems defrosting is accomplished by merely shutting off the compressor and permitting the evaporator fan to continue in operation. The circulation of air at temperatures above freezing thus caused suffices to melt the frost on the evaporator coil and there is no problem of the water freezing in the drip pan where it temporarily collects before running off into the sewer. On the other hand, the adoption of this type of evaporator as part of a low temperature system requires the application of heat, such as compressor discharge, for defrosting, and the low temperature also gives rise to the problem of defrosting melt freezing in the drip pan, which problem is solved by this invention.

Turning now to a detailed description of the evaporator constituting the subject matter of the present application, its general embodiment as a functioning evaporator will be only somewhat cursorily set forth because it is well known, is explained in the above named Patent No. 2,486,145, and, per se, forms no part of the present invention.

The evaporator coil is denoted generally by 1 and is composed of a plurality of runs or lengths of tubing arranged both concentrically and in vertical super-position, with the ends of the runs suitably connected by return bends so that the whole constitutes a continuous tube or flow path. One end of the coil is designed for connection with a refrigerant supply conduit, indicated at 2, connected with a condenser or receiver (not shown) of a refrigerating system, through a suitable pressure reducing device, such as a thermostatic expansion valve, marked 3. The other end of the coil (not shown) is adapted for connection with a suction conduit leading to the inlet of a compressor (also not shown). All this is conventional and requires neither illustration nor further description for an understanding of this invention. The coil is fitted with the usual fins 4, in suitable number and arrangement, all as is well understood by engineers in this field. Copper and aluminum are mentioned as appropriate materials for the coil and fins.

The evaporating unit embodies a casing, conveniently composed of sheet steel, that consists of a top portion 5, back portion 6, and wings 7, 8, extending forwardly from the back, and the return bends of the coil are securely fixed to the casing wings 7, 8, as by soldering, or in any other desired and appropriate manner, for supporting the coil in position within the casing. The said casing may be unitary or in separate parts fastened together.

Bracket arms, two of which are shown and marked 9, 10, are fixed to the under side of the casing top 5, as by welding, soldering, or bolts, and serve to carry a fan and electric motor unit denoted generally by 11.

The drip pan, preferably composed of sheet steel, is numbered 12, and it is hinged to the back 6 of the casing, as shown at 13, so that it may be closed as represented in Fig. 3, or swung open into a vertical hanging position as illustrated in Fig. 2. The pan has a peripheral upstanding flange 14 and is formed with a flanged fan opening 15, the said flanges enabling the pan temporarily to hold drip water during defrosting cycles of the system. A drain D is provided for connecting the pan with the sewer or some other disposal point.

For supplying heat to the drip pan there is provided a tube circuit 16 which consists of a pair of runs formed into U-shape at one extremity, while the two ends 17, 18, at the other extremity are designed and adapted to be connected into the defrosting conduit (not shown) and evaporator coil, respectively, with the result that, during each defrosting cycle of the system, the hot gas from compressor discharge circulates through the tube 16 as well as the evaporator coil 1.

The tube circuit 16 is affixed securely to the underside of the evaporator coil by a plurality of sheet metal clips 19 each of which is formed with a pair of half round recesses adapted to fit the tube, as clearly shown in Figs. 4 and 6. These clips are of suitable number, say six, and firmly united to the tube in substantially equally spaced relation by soldering or in any other appropriate manner. The clips 19, are, in turn, seated in blocks 20, which have grooves fitted to receive the backs of the clip recesses; and the said clips and blocks are fastened to the evaporator coil assembly by a series of through bolts equal in number to the clips and blocks, one of the bolts being shown in Figs. 3, 5 and 6, bearing the reference numeral 21. These bolts pass entirely through the assembly from the bottoms of the clips 19 to the top 5 of the casing, as clearly appears as the left side of Fig. 3, thus causing the heating means for the drip pan to be intimately associated with the evaporator coil and its casing.

Means is also embodied in the structure for pressing and holding the drip pan 12 closely against and in heat exchange relation with the tube circuit 16, which means consists of a set of pairs of small bolts, several being shown and marked 22 in Figs. 2, 4 and 5. These bolts are housed in small cups 23 which are drawn into the drip pan 12 when it is fabricated, so that the heads of the bolts will not protrude from the bottom surface of the pan. To avoid leakage around these bolts they may be fitted with washers or collars 24 composed of proper material, plastic being satisfactory. These bolts pierce the clips 19 and are made fast by nuts 25. The holes in the drip pan, illustrated as ten in number, through which the bolts 22 pass, are well shown in Figs. 1 and 2 where they are denoted in part by 26.

It will thus be seen that, when the drip pan is closed in operative position, there will be established a functionally adequate heat exchange relationship between it and the heating tube circuit 16.

These evaporator units are usually positioned at the ceiling of the room or space to be cooled and, for this purpose, three slotted arms, two being shown and marked 27, are suitably fixed, as by soldering, or welding, or bolts, to the edge of the top 5 of the coil casing, to cooperate with ceiling cap screws 28 for fixing the unit in position. The ceiling and one side wall of the room or space are indicated in Figs. 1, 2 and 3 where they are marked 29 and 30 respectively.

As this invention relates solely to the structure of the evaporating unit and is not concerned with the refrigerating or air conditioning functioning of the system in which the unit is incorporated, such functioning will not be herein detailed. But it should be mentioned that, as is thoroughly familiar to those cognizant of the essentials of this industry, evaporators in low temperature systems require defrosting by the application of heat which is commonly supplied from the compressor hot gas discharge by, at selected intervals, opening direct communication from the compressor discharge to the evaporator coil for a flow of hot refrigerant through a defrosting conduit that by-passes the condenser; the opening and closing of the said defrosting conduit being governed by a valve, e.g. solenoid, controlled by appropriate timing mechanism, e.g. electric clock, which also usually controls the running of the evaporator fan. See, for instance, U.S. patents to Anthony F. Hoesel, No. 2,281,770, dated May 5, 1942; Israel Kramer, No. 2,440,146 dated April 20, 1948; George Frie, No. 2,463,027, dated March 1, 1949; Otto J. Nussbaum, No. 2,530,440, dated November 21, 1950; and Israel Kramer, No. 2,621,051, dated December 9, 1952.

In the operation of the present invention, assuming the evaporating unit to be embodied in a refrigeration system of the low temperature type, the normal circulation of refrigerant through the evaporator coil in refrigerating cycles will chill the adjacent air and the operation of the evaporator fan will cause the cooled air to flow out from the unit in radial directions to cool the room or space within which the evaporator is installed, while constantly drawing in warmer air to be chilled and circulated throughout the room or space.

When, now, a defrosting cycle is initiated, as above explained, the hot refrigerant gas from the compressor will flow not only through the evaporator coil 1, but also through the heating tube circuit 16, thus, preventing the melt from the evaporator coil which drips into the pan from freezing therein, and insuring that it will drain off into the sewer.

Thus, this evaporator unit adapts itself to installation in low temperature systems, and the heating means for the drip pan neither handicaps its functioning in any respect nor interferes with its ready opening to expose the interior of the unit for servicing or repair.

Details of fabrication and construction not set forth herein are within the skill and information of engineers in this field, such, for instance, as the use of integral elements or those composed of parts; manner of producing parts or elements, as by drawing, die stamping, casting, etc.; and procedure in uniting parts. But it may be mentioned that the evaporator coil and drip pan heating tube may be in continuous length bent by well known means to final form, or may have separate return bends suitably fastened to the ends of the coil or tube runs, as by soldering or welding. Also, that the through bolts 21 might be employed to secure the several members of the evaporating unit, including the drip pan, together and in operative position, in lieu of other fastening means. Also the drip pan may be bolted or clipped rather than hinged to the straight back of the unit casing so that the entire pan is removable.

It will be understood that various changes may be made in the form, construction, arrangement, and materials of the several parts without departing from the spirit or scope of the invention; and, hence, we do not intend to be limited to details herein shown or described, except as the same may be included in the claims or be required by disclosures of the prior art.

What we claim is:

1. An evaporator coil unit adapted for embodiment in low temperature refrigeration systems comprising, a casing for the coil, said casing having top and back, a movable drip pan for receiving melt from the coil during defrosting cycles of the system, a tube circuit adapted for heating the drip pan during such cycles, the said tube circuit being located at the bottom of the coil, the drip pan being hinged to the casing and adapted to be swung open for providing access to the interior of the casing and coil and to be swung closed to bring it into operative position pressing against the tube circuit, and means for securing the drip pan in closed position.

2. A unit as defined in claim 1, in which the coil is curved, the top of the casing covers the top of the coil, the back of the casing reaches across the ends of the coil, the drip pan is hinged to the back of the casing and covers the bottom of the coil when closed into operative position, means for forcing air radially through the coil is housed in the casing, and the heating tube circuit is curved to conform to the coil.

3. A unit as defined in claim 2, which also includes means for securing the casing, the coil, and the heating tube circuit in assembly.

4. A unit as defined in claim 3, in which the means for securing the drip pan in closed position pressing against the heating tube circuit is operable independently of the means for securing the casing, the coil, and the heating tube circuit in assembly.

References Cited in the file of this patent

UNITED STATES PATENTS

| | | |
|---|---|---|
| 2,266,373 | Marlow | Dec. 16, 1941 |
| 2,592,394 | Cochran | Apr. 8, 1952 |
| 2,637,983 | Malkoff | May 12, 1953 |
| 2,688,850 | White | Sept. 14, 1954 |
| 2,759,339 | Kundert | Aug. 21, 1956 |
| 2,773,364 | Zipser | Dec. 11, 1956 |